United States Patent [19]

Heyman

[11] Patent Number: 4,503,207

[45] Date of Patent: Mar. 5, 1985

[54] PROCESS FOR THE PREPARATION OF ACRYLAMIDE GRAFT POLYMER DISPERSIONS

[75] Inventor: Duane A. Heyman, Monroe, Mich.

[73] Assignee: BASF Wyandotte Corporation, Wyandotte, Mich.

[21] Appl. No.: 510,565

[22] Filed: Jul. 5, 1983

[51] Int. Cl.³ .............................................. C08L 33/26
[52] U.S. Cl. ................................. 526/307.5; 524/760; 524/761; 524/762; 524/765; 524/923; 525/46; 525/455; 525/530
[58] Field of Search .............. 524/760, 761, 762, 765, 524/923; 525/46, 455, 530; 526/307.5

[56] References Cited

U.S. PATENT DOCUMENTS

| | | | |
|---|---|---|---|
| Re. 28,715 | 2/1976 | Stamberger | 526/11.1 |
| Re. 29,014 | 10/1976 | Pizzini et al. | 526/11.1 |
| 3,190,927 | 6/1965 | Patton et al. | 260/615 |
| 3,346,557 | 10/1967 | Patton et al. | 260/209 |
| 3,652,658 | 3/1972 | Fried | 260/490 |
| 3,875,258 | 4/1975 | Patton et al. | 260/961 |
| 3,931,092 | 1/1976 | Ramlow et al. | 526/11.1 |
| 3,950,317 | 4/1976 | Patton et al. | 259/4 |
| 3,980,622 | 9/1976 | Kozuka et al. | 526/240 |

*Primary Examiner*—Maurice J. Welsh
*Attorney, Agent, or Firm*—Norbert M. Lisicki

[57] ABSTRACT

Graft polymer dispersions are prepared by polymerizing aqueous solutions of acrylamide in unsaturation-containing polyols. These dispersions are employed in preparing polyurethane products.

6 Claims, No Drawings

PROCESS FOR THE PREPARATION OF ACRYLAMIDE GRAFT POLYMER DISPERSIONS

BACKGROUND OF THE INVENTION

1. Field of the Invention

The present invention relates to a process for the preparation of graft polymer dispersions having low viscosity. More particularly, the invention relates to the process for the polymerization of acrylamide monomer employing unsaturation containing polyols in the presence of a free radical catalyst and the polyurethane products prepared therefrom.

2. Description of the Prior Art

The prior art as evidenced by U.S. Pat. Nos. 3,652,658; 3,875,258; 3,950,317; and reissue U.S. Pat. Nos. Re. 28,715 and Re. 29,014 teaches the preparation of graft polymer dispersions which are useful in the preparation of polyurethanes by the polymerization of ethylenically unsaturated monomers in polyols. The above patents disclose various methods of preparing graft polymer dispersions. U.S. Pat. No. 3,931,092 teaches the preparation of polymeric solids by carrying out the polymerization in the presence of a free radical initiator and an organic solvent. The present invention relates to an improvement in the preparation of graft polymer dispersions employing aqueous solutions of acrylamide or methacrylamide monomers.

DESCRIPTION OF THE PREFERRED EMBODIMENTS

In accordance with the present invention, graft polymer dispersions are prepared by the in situ polymerization of acrylamide monomer in an unsaturation containing polyol in the presence of a free radical catalyst. Since acrylamide is a solid and is not appreciably soluble in other monomers such as styrene, and, furthermore, the handling of acrylamide is hazardous because its dust is toxic, standard methods of preparation are not possible. A method has been found overcoming these difficulties. This method involves the addition of aqueous solutions of acrylamide to the polyol reaction mixture and polymerization while the water is being removed. The acrylamide solubility in water is such that a 50 percent or greater aqueous solution can be prepared. Furthermore, acrylamide may be purchased as an aqueous solution which further reduces the hazard of handling acrylamide.

The unsaturated polyols which are employed in the present invention may be prepared by the reaction of any conventional polyol such as those described below with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, isocyanate or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryoyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether) and aliphatic and aromatic isocyanates and polyisocyanates. If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

Representative polyols essentially free from ethylenic unsaturation which may be employed to prepare the unsaturated polyols as well as in combination with the graft polymer dispersions are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 100 to 10,000 preferably from 1000 to 3000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology,* Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2′-(4,4′-hydroxyphenyl)propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The graft polymer dispersions of the invention are prepared by the in situ polymerization, in the above-described polyols of an aqueous solution of acrylamide.

The amount of acrylamide employed in the polymerization reaction is generally from 10 weight percent to 60 weight percent, preferably from 20 percent to 40 percent, based on the total weight of the dispersion. The polymerization occurs at a temperature between about 25° C. and 180° C., preferably from 80° C. to 135° C.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α′-azobis-(2-methyl heptonitrile), 1,1′-azo-bis(cyclohexane carbonitrile), 4,4′-azobis(4-cyanopentanoic acid), 2,2′-azobis(isobutyronitrile), 1-t-butylazo-1-cyanocyclohexane, persuccinic acid, diisopropyl peroxy dicarbonate, 2,2′-azobis(2,4-dimethylvaleronitrile), 2-t-butylazo-2-cyano-4-methoxy-4-methylpentane, 2,2′-azobis-2-methylbutanenitrile, 2-t-butylazo-2-cyanobutane, 1-t-amylazo-1-cyanocyclohexane, 2,2′-azobis(2,4-dimethyl-4-methoxyvaleronitrile), 2-t-butylazo-2-cyano-4-methylpentane, 2-t-butylazo-2-isobutyronitrile, to butylperoxyisopropyl carbonate and the like; a mixture of initiators may also be used. The preferred initiators are 2,2′-azobis(2-methylbutanenitrile), 2,2′-azobis-(isobutyronitrile), 2,2′-azobis(2,4-dimethylvaleronitrile), 2-t-butylazo-2-cyano-4-methoxy-4-methylpentane, 2-t-butylazo-2-cyano-4-methylpentane, and 2-t-butylazo-2-cyanobutane. Generally, from about 0.01 percent to about 5 percent, preferably from about 0.5 percent to about 1.5 percent, by weight of initiator based on the weight of the monomer will be employed in the process of the invention.

Chain transfer agents may be employed as reaction moderators. The polymerization reaction may be carried out at temperatures between 25° C. and 180° C., preferably between 80° C. and 135° C. The polyol mixture contains at least 0.001 mole of unsaturation per mole of polyol and may contain as much as 3 mole of unsaturation per mole of polyol.

Among those chain transfer agents which may be employed are as follows: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanide, 1-phenylbutyne, p-cresol, p-bromocumene, dibenzoaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutyraldehyde, diethyl bromomalonate, bromotrichloromethane, dibromoethane, diiodomethane, naphthalene, 1-naphthol, 2-naphthol, methyl oleate, 2,4,4-triphenyl-1-pentene, 4-methyl-2-pentene, 2,6-diisopropylphenol, phenyl ether, phenylphosphine, diethylphosphine, dibutylphosphine, phophorus trichloride, 1,1,1-tribromopropane, dialkyl phthalate, 1,2-propanediol, 3-phosphinopropionitrile, 1-propanol, pyrocatechol, pyrogallol, methyl stearate, tetraethylsilane, triethylsilane, dibromostilbene, , α-bromostyrene, α-methylstyrene, tetraphenyl succinonitrile, 2,4,6-trinitrotoluene, p-toluidine, N,N-dimethyl-p-toluidine, α-cyano-p-tolunitrile, α′α′-dibromo-p-xylene, 2,6-xylenol, diethyl zinc, dithiodiacetic acid, ethyl dithiodiacetic acid, 4,4′-dithio-bisanthranilic acid, benzenethiol, o-ethoxybenzenethiol, 2,2′-dithiobisbenzothiazole, benzyl sulfide, 1-dodecanethiol, ethanethiol, 1-hexanethiol, 1-naphthalenethiol, 2-naphthalenethiol, 1-octanethiol, 1-heptanethiol, 2-octanethiol, 1-tetradecanethiol, α-toluenethiol, isopropanol, 2-butanol, toluene, bromochloromethane, 1-butanol, carbon tetrachloride, 2-mercaptoethanol, octadecyl mercaptan, carbon tetrabromide and tertiary dodecyl mercaptan. The chain transfer agent employed may range from 0.1 to 10 percent by weight based on the weight of the monomer.

The polyurethane foams employed in the present invention are generally prepared by the reaction of a graft polymer dispersion with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4′-diphenylmethane diisocyanate, 4,4′-biphenylene diisocyanate, 3,3′-dimethoxy-4,4′-biphenyl diisocyanate, 3,3′-dimethyl-4,4′-biphenyl diisocyanate and 3,3′-dimethyldiphenylmethane-4,4′-diisocyanate; the triisocyanates such as 4,4′,4″-triphenylmethane triisocyanate, and toluene 2,4,6-triisocyanate; and the tetraisocyanates such as 4,4′-dimethyldiphenylmethane-2,2′-5,5′-tetraisocyanate and polymeric polyiosocyanates such as polymethylene polyphenylene polyisocyanate. Especially useful due to their availability and properties are toluene diisocyanate, 4,4′-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N′-di(2-hydroxypropyl)ethylenediamine, piperazine, and 2-methylpiperazine.

Any suitable catalyst for the preparation of polyurethane foams may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N′-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

Among the flame retardants which may be employed are: pentabromodiphenyl oxide, dibromopropanol, tris($\beta$-chloropropyl)phosphate, 2,2-bis(bromoethyl) 1,3-propanediol, tetrakis(2-chloroethyl)ethylene diphosphate, tris(2,3-dibromopropyl)phosphate, tris($\beta$-chloroethyl)phoshate, tris(1,2-dichloropropyl)phosphate, bis-(2-chloroethyl) 2-chloroethylphosphonate, molybdenum trioxide, ammonium molybdate, ammonium phosphate, pentabromodiphenyloxide, tricresyl phosphate, hexabromocyclododecane and dibromoethyldibromocyclohexane. The concentrations of flame retardant compounds which may be employed range from 1 to 25 parts per 100 parts of polyol mixture.

The following examples illustrate the nature of the invention. All parts are by weight unless otherwise stated. In the examples, the physical properties of the polyurethane foam were determined by the D3574-81 ASTM tests.

The following abbreviations are employed in the examples below:

Polyol A is an ethylene oxide, propylene oxide adduct of glycerine containing 9 percent ethylene oxide, having a hydroxyl number of 50 and containing 0.3 mole of unsaturation per mole of polyol.

Polyol B is an ethylene oxide, propylene oxide adduct of glycerine and propylene glycol containing 15 percent ethylene oxide, having a hydroxyl number of 33 and containing 0.3 mole of unsaturation per mole of polyol.

Polyol C is Polyol A containing 20 percent 1:1 acrylonitrole:styrene copolymer having a hydroxyl number of 40.

Polyol D is an ethylene oxide, propylene oxide adduct of trimethylolpropane, containing 0.5 mole of unsaturation per mole of polyol, having a hydroxyl number of 23 and containing 4.2 percent ethylene oxide.

Polyol E is an ethylene oxide, propylene oxide adduct of glycerine containing 12.5 percent ethylene oxide having a hydroxyl number of 50.

Dabco 33LV 33 percent solution of triethylenediamine in dipropylene glycol.

L6202 silicone surfactant.

T-9 dibutyltin dilaurate.

EXAMPLES 1-7

The products of Examples 1-7 were prepared by adding 200 pbw of Polyol A to a suitable reactor equipped with a stirrer, nitrogen inlet, thermowell, distillation head and inlet tube. The polyol was heated to the indicated temperature. A monomer stream consisting of 100 pbw of acrylamide in 100 pbw of water and a polyol stream consisting of 200 pbw of Polyol A and 2 pbw of 2,2'-azobisisobutyronitrile were added through a Kenics static mixer. The addition times ranged from 90 to 110 minutes. Water was removed continuously during the addition period. After the addition was completed, the mixture was reacted for an additional 30 minutes. The mixture was then stripped of volatiles. The viscosities of the resulting products are tested in Table I. Polyol B was employed in Example 6 instead of Polyol A.

The products of Examples 8 and 9 were prepared by adding 5 pbw of Polyol D and 195 pbw of Polyol E to a suitable reactor equipped with a stirrer, nitrogen inlet, thermowell, distillation head and inlet tube. The mixture was heated to the indicated temperature. A monomer stream consisting of 100 pbw of acrylamide in 100 pbw of water and a polyol stream consisting of 200 pbw of Polyol E and 1 pbw of 2,2'-azobis(2-methylbutyronitrile were added through a Kenics static mixer. The following procedure was followed as shown above. Example 9 was prepared in the presence of 1 pbw of dodecanethiol.

TABLE I

| Examples | Polyol Charge pbw | Polyol Feed pbw | Acrylamide pbw | Temperature °C. | Viscosity cps, 25° C. |
|---|---|---|---|---|---|
| 1 | 200 | 200 | 100 | 115 | 1650 |
| 2 | 200 | 200 | 100 | 120 | 1660 |
| 3 | 200 | 200 | 100 | 120 | 1730 |
| 4 | 200 | 200 | 100 | 110 | 1530 |
| 5 | 200 | 200 | 100 | 105 | 1265 |
| 6 | 200 | 200 | 100 | 115 | 3825 |
| 7 | 1200 | 1200 | 600 | 115 | 1620 |
| 8 | 200 | 200 | 100 | 120 | 1500 |
| 9 | 200 | 200 | 100 | 120 | 1560 | pbw = parts by weight

EXAMPLES 10-15

The polyurethane foams of Table II were prepared by charging a one-quart cylindrical container with a suitable quantity of the polyol, water, catalysts, and silicone surfactant. The mixture was stirred for about 30 seconds, allowed to set for about 15 seconds and then stirring was resumed. After about 60 seconds elapsed time, the polyisocyanate was added to the container, and the resulting mixture was stirred for about 4 to 5 seconds. The content of the container was then immediately poured into a cardboard cake box, and the foam was allowed to rise therein. After the foam rise was completed, the resulting foam was oven cured for about 15 minutes.

Table II sets forth the ingredients and amounts thereof used to prepare the foams as well as the physical properties of the foams.

TABLE II

|  | Example | | | | | |
|---|---|---|---|---|---|---|
|  | 10 | 11 | 12 | 13 | 14 | 15 |
| Polyol C, pbw | 300 | 300 | 300 | 0 | 0 | 0 |
| Dispersion of Example 7,pbw |  |  |  | 300 | 300 | 300 |
| Distilled Water, ml | 9.0 | 9.0 | 9.0 | 9.0 | 9.0 | 9.0 |
| DABCO 33LV, ml | 0.9 | 0.9 | 0.9 | 0.9 | 0.9 | 0.9 |
| L6202 Silicone, ml | 3.0 | 3.0 | 3.0 | 3.0 | 3.0 | 3.0 |
| T-9 Catalyst, ml | 0.40 | 0.40 | 0.40 | 0.40 | 0.40 | 0.40 |
| 80/20 TDI (105 Index), pbw | 111.0 | 111.0 | 111.0 | 111.0 | 111.0 | 111.0 |
| Rise Time, sec. | 97 | 99 | 98 | 134 | 132 | 132 |
| Density, pcf | 1.90 | 1.98 | 2.20 | 2.03 | 2.01 | 2.09 |
| Tensile Strength, psi | 19.4 | 16.2 | 17.7 | 24.2 | 24.9 | 19.5 |
| Elongation, % | 213 | 217 | 210 | 237 | 260 | 223 |

TABLE II-continued

| | Example | | | | | |
|---|---|---|---|---|---|---|
| | 10 | 11 | 12 | 13 | 14 | 15 |
| Block Tear, psi | 2.3 | 2.5 | 3.2 | 2.7 | 2.8 | 2.9 |
| CLD, psi 50% deflection | 0.92 | 1.02 | 1.37 | 1.15 | 1.12 | 1.15 |
| CLD, psi (Humid Aged) 50% deflection | 0.71 | 0.73 | 1.03 | 0.77 | 0.79 | 0.84 |
| Compression Set, % | | | | | | |
| 50% | 4.2 | 5.0 | 4.4 | 4.9 | 6.2 | 5.0 |
| 90% | 6.0 | 5.6 | 6.6 | 7.7 | 13.2 | 7.1 |
| Compression Set, % (Humid Aged) | | | | | | |
| 50% | 6.0 | 6.3 | 5.4 | 7.9 | 8.3 | 7.3 |
| 90% | 9.4 | 8.8 | 7.8 | 12.7 | 32.4 | 10.1 |
| Air Flow, CFM | 2.43 | 2.44 | 2.59 | 0.17 | 0.19 | 0.2 |

The embodiments of the invention in which an exclusive privilege or property is claimed are defined as follows:

1. A white, stable low viscosity graft polymer dispersion prepared by polymerizing, in the presence of an effective amount of a free radical initiator, in an unsaturation containing polyol or polyol mixture, an aqueous solution of acrylamide and removing the water during or after said polymerization.

2. The polymer dispersion of claim 1 wherein the amount of acrylamide is from 10 weight percent to 60 weight percent based on the total weight of the dispersion.

3. The polymer dispersion of claim 1 wherein the amount of acrylamide is from 20 weight percent to 40 weight percent based on the total weight of the dispersion.

4. A process for the preparation of a white stable low viscosity graft polymer dispersions comprising polymerizing in the presence of an effective amount of a free radical initiator in an unsaturation containing polyol or polyol mixture, an aqueous solution of acrylamide and removing the water during or after said polymerization.

5. The process of claim 4 wherein the amount of acrylamide is from 10 weight percent to 60 weight percent based on the total weight of the dispersion.

6. The process of claim 4 wherein the amount of acrylamide is from 20 weight percent to 40 weight percent based on the total weight of the dispersion.

* * * * *